United States Patent [19]

Galbraith

[11] Patent Number: 4,528,249
[45] Date of Patent: Jul. 9, 1985

[54] ELECTROCHEMICAL CELL AND METHOD

[75] Inventor: Andrew D. Galbraith, Los Altos, Calif.

[73] Assignee: Lockheed Missiles & Space Company, Inc., Sunnyvale, Calif.

[21] Appl. No.: 664,106

[22] Filed: Oct. 24, 1984

Related U.S. Application Data

[63] Continuation-in-part of Ser. No. 497,252, May 19, 1983, abandoned.

[51] Int. Cl.$^3$ .......................................... H01M 12/06
[52] U.S. Cl. ...................................... 429/15; 429/27
[58] Field of Search ...................... 429/13, 15, 27, 50

[56] References Cited

U.S. PATENT DOCUMENTS

| | | | |
|---|---|---|---|
| 3,507,703 | 4/1970 | Heredy | 429/27 |
| 3,758,339 | 9/1973 | Manion | 429/13 |
| 4,001,043 | 1/1977 | Momyer | 429/206 |
| 4,126,733 | 11/1978 | Doniat | 429/15 |
| 4,220,690 | 9/1980 | Blurton et al. | 429/15 |
| 4,317,863 | 3/1982 | Struthers | 429/27 |
| 4,328,291 | 5/1982 | Winsel | 429/27 |

Primary Examiner—Donald L. Walton
Attorney, Agent, or Firm—Wood, Dalton, Phillips, Mason, & Rowe

[57] ABSTRACT

A method and apparatus for providing electrical energy. The apparatus defines an electrochemical cell having a lithium-containing anode and an air cathode. Electrolyte solution containing soluble oxygen is flowed into contact with one surface of the air cathode. The opposite surface of the air cathode is exposed to ambient atmosphere. A catalytic screen is provided between the anode and cathode where the soluble oxygen is present in the electrolyte in the form of $H_2O_2$ for catalyzing decomposition of the $H_2O_2$ and the reaction between the $H_2O_2$ and the cathode ions. A pump is provided for selectively controlling the rate of flow of the electrolyte, as desired.

25 Claims, 2 Drawing Figures

ELECTROCHEMICAL CELL AND METHOD

CROSS REFERENCE TO RELATED APPLICATION

This is a continuation-in-part of copending, commonly assigned application Ser. No. 497,252 filed May 19, 1983, now abandoned.

TECHNICAL FIELD

This invention relates to electrochemical cells and in particular to electrochemical cells having an air cathode.

BACKGROUND ART

One conventional form of electrochemical cell for providing electrical power utilizes a lithium anode and an air cathode. A limitation on the power developing ability of such cells, however, adversely restricts the usefulness thereof in high power density applications, such as present in aeronautical propulsion systems.

Another form of conventional battery utilizes a lithium anode with hydrogen peroxide electrolyte. Such batteries provide greater power output than the air cell batteries, but have a serious disadvantage in relatively high weight and cost. Thus, again, such peroxide system batteries are not adapted for use in aeronautical propulsion high power density systems.

DISCLOSURE OF INVENTION

The present invention comprehends an improved lithium oxygen cell having means for providing supplemental oxidizer to the cathode reaction whenever the air cathode reaction cannot provide a sufficiently high rate of electrochemical reaction.

More specifically, the novel method of the present invention comprehends contacting a first surface portion of the air cathode with or another oxygen-containing gas, and contacting a second surface portion of the air cathode with an electrolyte containing soluble oxygen for providing oxidizer to the cathode.

The invention comprehends the method of providing electrical energy in such an electrochemical cell by providing the oxidizer to the cathode in the event the air cathode reaction with the contacted air is insufficient to provide the desired rate of electrochemical reaction of the cell. The invention comprehends the further step of catalyzing the decomposition of the soluble oxygen which may be present in the form of $H_2O_2$ in the electrolyte for increasing the reaction thereof with the cathode ions.

The invention further comprehends the provision of an electrochemical cell having a lithium anode and a hydrophobic air cathode comprising a porous element having a first surface portion exposed to ambient air and fluid electrolyte comprising an aqueous solution of hydrogen peroxide contacted with a second surface portion of the air cathode porous element.

The invention further comprehends the provisions in such an electrochemical cell of means disposed intermediate the anode and cathode for catalyzing the decomposition of the hydrogen peroxide and the reaction between the hydrogen peroxide and the cathode ions.

In the illustrated embodiment of the invention, the air cathode is porous.

In the illustrated embodiment, the electrolyte is flowed through the cell.

The concentration of the soluble oxygen in the electrolyte may be varied selectively to meet the power demand needs. Alternatively, the rate of flow of the electrolyte may be controlled for this purpose.

The method of providing electrical energy and the electrochemical cell structure utilizing the method are extremely simple and economical, while yet providing a highly improved, lightweight air cathode electrochemical cell power supply permitting high power demand when desired.

BRIEF DESCRIPTION OF THE DRAWINGS

Other features and advantages of the invention will be apparent from the following description taken in connection with the drawing wherein.

BEST MODE FOR CARRYING OUT THE INVENTION

Figure 1:
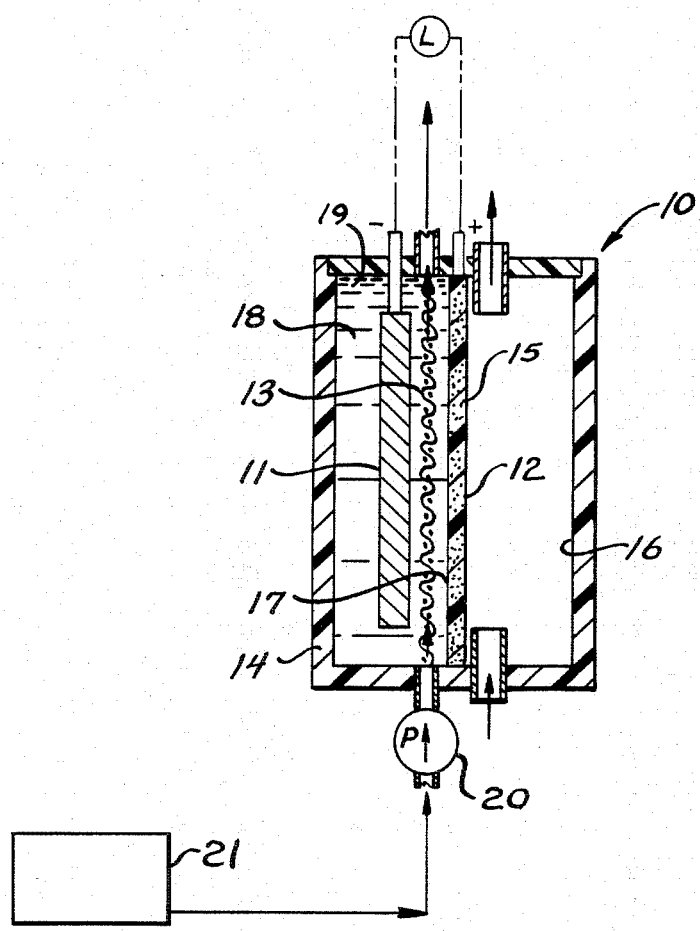
FIG. 1 is a transverse section illustrating an electrochemical cell embodying the invention and illustrating the method of providing electrical energy from an air cathode electrochemical cell embodying the invention.

In the illustrative embodiment of the invention as disclosed in the drawings, an electrochemical cell generally designated 10 is shown to include an anode 11, an oxygen-consuming cathode 12, and a catalytic screen 13 interposed between the anode and cathode within an outer housing 14.

The cathode 12 is typically an air cathode through which atmospheric air flows. It will be appreciated by those skilled in the art, however, that such a cathode may operate with any oxygen-containing gas.

One surface 15 of the air cathode is exposed to ambient atmosphere (or a source of another oxygen-containing gas) in a chamber 16 of housing 14, and the opposite surface 17 of the air cathode is contacted by electrolyte fluid 18 flowed through a second chamber 19 in housing 14 as by a suitable pump 20.

In the illustrated embodiment, the electrolyte is provided from a reservoir 21 for suitable delivery when needed.

More specifically, anode 11 comprises a lithium anode which may comprise elemental lithium metal, lithium in compound form, or lithium alloyed with alloying material, such as small amounts of aluminum.

The air cathode 12 may comprise a conventional cathode structure formed of a suitable porous hydrophobic material, such as Teflon synthetic resin coated with a suitable catalytic material, such as a graphite-platinum matrix, for catalyzing the cathodic reaction of oxygen with cathode ions.

The catalytic screen 13 illustratively may comprise a woven metal wire screen formed of suitable catalytic metal, such as palladium ruthenium, or silverplated wire.

In the illustrated embodiment, the electrolyte comprises a fluid containing soluble oxygen for providing a supplemental oxidizer to the cathode. In the illustrated embodiment, the electrolyte comprises a solution of 4.2±molar lithium hydroxide in water with a preselected concentration of $H_2O_2$. The $H_2O_2$ provides water soluble oxygen for providing the oxidizer to the cathode reaction whenever the air cathode reaction is insufficient to meet the power demands of the cell.

The $H_2O_2$ may be present in a concentration of up to approximately 1.0 molar in the aqueous solution.

Figure 2:
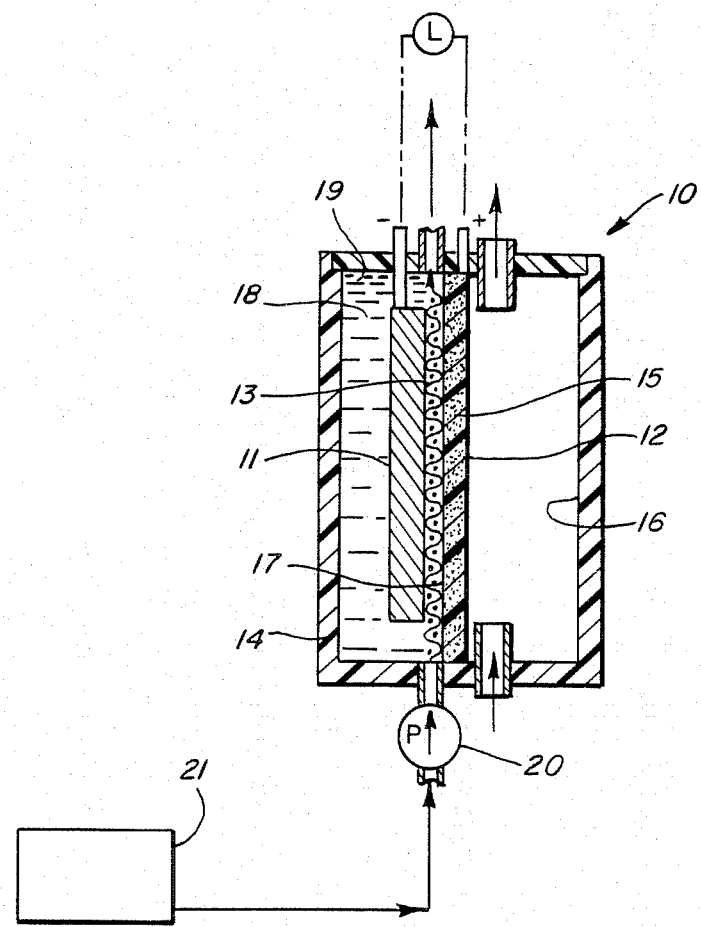
FIG. 2 is a transverse section illustrating another embodiment of an electrochemical cell of the invention.

FIG. 2 illustrates an embodiment of a cell made according to the invention wherein the screen 13 is in electrical contact with the cathode 12, and in mechanical contact with the anode 11. Of course, the screen 13 is not in electrical contact with the anode 11, due to the presence of an insulating, porous lithium hydroxide (LiOH) film which is formed on the anode surface by contact thereof with humid air, as is well known in the art.

FIG. 2 represents a preferred embodiment of the invention, as power losses are significantly reduced. If desired, the screen 13 may be in electrical contact with the cathode 12 but not in mechanical contact with the anode 11.

Thus, the invention comprehends an improved method of providing electrical energy from an electrochemical cell having a lithium-containing anode and an air cathode, wherein supplemental oxidizer is provided to the cathode as required to meet intermittent high power demands exceeding the ability of the cathode to provide the desired power by an air cathode reaction with atmospheric air alone.

By contacting opposite sides of an active cathode with peroxide and atmospheric or other oxygen, respectively, a novel method and structural arrangement is provided, solving the vexatious problem of the prior art wherein air cathode electrochemical cells have not been found capable of adaptation for high power demand loads where weight is at a premium.

INDUSTRIAL APPLICABILITY

The present invention is advantageously adapted for use in aeronautical propulsion applications. Illustratively, where a hydrogen peroxide cell of the prior art was utilized to provide the electrical power in the power plant of a Hughes Model 269 helicopter, the hydrogen peroxide weight accounted for 50 percent of the entire power train.

It has been found that use of an electrochemical cell in accordance with this invention, providing approximately 400 ma/cm$^2$ out of a design load of 1000 ma/cm$^2$, would reduce the peroxide weight by 40 percent or more, and thus substantially improve the power-to-weight ratio of the electrochemical cell system, making it advantageously adapted for such aeronautical propulsion use.

Obviously, other industrial applications requiring high intermittent power demand output at light weight of the electrochemical cell structure may utilize the method and apparatus of the present invention advantageously.

The foregoing disclosure of specific embodiments is illustrative of the broad inventive concepts comprehended by the invention.

I claim:

1. The method of providing electrical energy from an electrochemical cell having a lithium-containing anode and an oxygen-consuming cathode, comprising the steps of:
   contacting a first surface portion of the cathode with an oxygen-containing gas; and
   contacting a second surface portion of the cathode with an electrolyte containing soluble oxygen for providing oxidizer to the cathode.

2. The method of providing electrical energy from an electrochemical cell having a lithium-containing anode and an oxygen-consuming cathode, comprising the steps of:
   contacting a first surface portion of the cathode with an oxygen-containing gas; and
   contacting a second surface portion of the cathode with an electrolyte containing soluble oxygen for providing oxidizer to the cathode in the event the cathode reaction with the contacted gas is insufficient to provide a desired rate of electrochemical reaction of the cell.

3. The method of providing electrical energy from an electrochemical cell having a lithium-containing anode and an oxygen-consuming cathode, comprising the steps of:
   contacting a first surface portion of the cathode with an oxygen-containing gas;
   contacting a second surface portion of the cathode with an electrolyte containing soluble oxygen for providing oxidizer to the cathode; and
   catalyzing the decomposition of the soluble oxygen in the electrolyte for increasing the rate of reaction thereof with cathode ions.

4. The method of providing electrical energy of claims 1, 2 or 3 wherein said cathode is porous.

5. The method of providing electrical energy of claims 1, 2 or 3 wherein said electrolyte is flowed through the cell.

6. The method of providing electrical energy of claims 1, 2 or 3 wherein said electrolyte comprises an aqueous solution containing water soluble oxygen.

7. The method of providing electrical energy of claims 1, 2 or 3 wherein said electrolyte comprises $H_2O_2$.

8. The method of providing electrical energy of claims 1, 2 or 3 wherein said electrolyte comprises a solution containing a variable selected concentration of soluble oxygen.

9. The method of claims 1, 2 or 3 wherein said cathode is an air cathode.

10. The method of claims 1, 2 or 3 wherein said oxygen containing gas is atmospheric air.

11. An electrochemical cell comprising:
    a lithium-containing anode;
    a hydrophobic oxygen-consuming cathode comprising a porous element having a first surface portion exposed to a source of oxygen-containing gas; and
    a fluid electrolyte comprising an aqueous solution of soluble oxygen contacted with a second surface portion of the cathode porous element.

12. An electrochemical cell comprising:
    a lithium-containing anode;
    a hydrophobic oxygen-consuming cathode comprising a porous element having a first surface portion exposed to a source of an oxygen-containing gas;
    a fluid electrolyte comprising an aqueous solution of soluble oxygen contacted with a second surface portion of the cathode porous element; and,
    means disposed intermediate said anode and cathode for catalyzing decomposition of the soluble oxygen in the electrolyte and the cathode ions.

13. The electrochemical cell of claims 11 or 12 wherein said cathode is porous.

14. The electrochemical cell of claims 11 or 12 wherein said electrolyte comprises an aqueous solution containing water soluble oxygen.

15. The electrochemical cell of claims 11 or 12 wherein said electrolyte comprises $H_2O_2$.

16. The electrochemical cell of claims 11 or 12 wherein said electrolyte comprises a solution containing a variable selected concentration of soluble oxygen.

17. The electrochemical cell of claims 11 or 12 wherein said electrolyte comprises a liquid solution flowed through said cell.

18. The electrochemical cell of claims 11 or 12 further including means for controlling the rate of flow of the electrolyte in contacting said cathode second surface portion.

19. The electrochemical cell of claims 11 or 12 wherein said cathode is an air cathode.

20. The electrochemical cell of claims 11 or 12 wherein said oxygen-containing gas is atmospheric air.

21. The electrochemical cell of claims 11 or 12 wherein said source of oxygen-containing gas is ambient air.

22. The electrochemical cell of claim 12 wherein said catalytic means comprises a screen of a catalytic metal.

23. The electrochemical cell of claim 22 wherein said catalytic metal is selected from the group consisting of paladium, ruthenium, and silver plated wire.

24. The electrochemical cell of claim 22 wherein said screen is in electrical contact with said cathode.

25. The electrochemical cell of claim 24 wherein said screen is in mechanical contact with said anode.

* * * * *